United States Patent
Johnson et al.

(10) Patent No.: US 9,532,656 B2
(45) Date of Patent: Jan. 3, 2017

(54) FLOOR BRAKE ASSEMBLY FOR AN ARTICLE OF FURNITURE

(71) Applicant: Sauder Manufacturing Co., Archbold, OH (US)

(72) Inventors: Timothy J. Johnson, Archbold, OH (US); Steven Stieglitz, Harlan, IN (US); Martin J. Krause, Jr., Fort Wayne, IN (US); Anthony J. Warncke, Archbold, OH (US)

(73) Assignee: Sauder Manufacturing Co., Archbold, OH (US)

( * ) Notice: Subject to any disclaimer, the term of this patent is extended or adjusted under 35 U.S.C. 154(b) by 0 days.

(21) Appl. No.: 14/731,805

(22) Filed: Jun. 5, 2015

(65) Prior Publication Data

US 2016/0353901 A1    Dec. 8, 2016

(51) Int. Cl.
*A47C 31/00* (2006.01)
*B62B 5/04* (2006.01)
*B60B 33/00* (2006.01)

(52) U.S. Cl.
CPC ........... *A47C 31/00* (2013.01); *B60B 33/0089* (2013.01); *B62B 5/049* (2013.01)

(58) Field of Classification Search
CPC ........ B62B 5/04; B62B 5/0433; B62B 5/0438; B62B 5/0457; B62B 5/0461; B62B 5/049; B60B 33/0089
USPC .............................. 188/5, 6, 7, 19, 21, 22, 23
See application file for complete search history.

(56) References Cited

U.S. PATENT DOCUMENTS

| | | | | |
|---|---|---|---|---|
| 2,236,281 A | * | 3/1941 | Anderson | B60S 9/04 188/5 |
| 2,360,874 A | * | 10/1944 | Herold | B62B 5/049 188/5 |
| 2,712,366 A | * | 7/1955 | Skupas | B60B 33/0089 188/21 |
| 2,747,692 A | * | 5/1956 | Holmes | B62B 5/049 188/5 |
| 2,796,150 A | * | 6/1957 | Gambardella | B62B 5/049 188/5 |
| 2,832,438 A | * | 4/1958 | Noyes | B62B 5/049 188/5 |
| 2,847,092 A | * | 8/1958 | Noyes | B62B 5/049 188/5 |
| 3,024,870 A | * | 3/1962 | Kramcsak, Jr. | B60S 9/02 188/5 |
| 3,554,328 A | * | 1/1971 | Jones | B62B 5/049 188/5 |
| 3,735,841 A | * | 5/1973 | Auriemma | B62B 5/049 188/5 |
| 5,431,254 A | * | 7/1995 | Kramer | B62B 5/049 188/19 |

(Continued)

*Primary Examiner* — Thomas J Williams
*Assistant Examiner* — Mariano Sy
(74) *Attorney, Agent, or Firm* — McGarry Bair PC (57) ABSTRACT

A floor brake assembly for an article of furniture includes a base adapted to be affixed to an article of furniture, a plunger having a brake pad at a plunger first end where the brake pad engages a floor and a second position where the brake pad is free of the floor, a pivot arm rotatably mounted to the base, a first activation arm pivotally mounted to the base, and a second activation arm pivotally mounted to the base. The pivot arm is rotated to a braking position and an unbraking position.

20 Claims, 5 Drawing Sheets

(56) References Cited

U.S. PATENT DOCUMENTS

| | | | | |
|---|---|---|---|---|
| 5,950,262 A * | 9/1999 | Smoler | ............... | A61G 13/0018 188/5 |
| 6,843,625 B2 * | 1/2005 | Hewitt | ...................... | B60P 7/08 280/763.1 |
| 7,040,460 B1 * | 5/2006 | Sherrill | ..................... | B25H 5/00 188/19 |
| 7,216,399 B2 * | 5/2007 | Webster | .................. | B62B 5/049 16/32 |
| 2007/0080030 A1 * | 4/2007 | Kramer | ..................... | B60T 1/14 188/5 |

* cited by examiner

FLOOR BRAKE ASSEMBLY FOR AN ARTICLE OF FURNITURE

BACKGROUND OF THE INVENTION

Articles of furniture can be configured to include wheeled contact points between the furniture and a floor that supports the furniture. These wheeled contact points enable the easy movement of the furniture relative to the supporting floor. Example furniture can include, but is not limited to, chairs, tables, beds, and the like. The movable furniture may further include a braking mechanism or assembly configured to enable a controllable brake, to prevent the movement of the furniture relative to the floor, for example, when a user stands up from a movable chair.

BRIEF DESCRIPTION OF THE INVENTION

In one aspect, a floor brake assembly for an article of furniture includes a base adapted to be affixed to an article of furniture and having a pivot point at a base first end, a bore at a base second end, a plunger extending through the bore and having a brake pad at a plunger first end and head at a plunger second end, wherein the plunger is moveable within the bore between a first position where the brake pad engages a floor and a second position where the brake pad is free of the floor, and wherein the plunger is biased away from the first position, a pivot arm rotatably mounted to the base intermediate the base first end and the base second end, and having a free end with a boss extending normally therefrom, wherein the pivot arm is rotatable between a braking position and an unbraking position, a first activation arm pivotally mounted to the base at the pivot point, and having an activation point engaging the head of the plunger and a cam surface between the mounting to the pivot point and activation point wherein the boss engages the cam surface, and a second activation arm pivotally mounted to the base at the pivot point, adjacent to the first activation arm, and having a free end biased away from the base, and having a continuous channel, wherein the boss engages the continuous channel, and the continuous channel includes a catch. When the pivot arm is rotated to the braking position, the boss traverses the continuous channel to stop at the catch while simultaneously engaging the cam surface to urge the activation point of the first activation arm against the head to force the plunger to the first position so that the brake pad engages the floor, and when the pivot arm is rotated to the unbraking position, the boss traverses the continuous channel out of the catch while simultaneously engaging the cam surface to enable the activation point of the first activation arm to move away from the base, allowing the bias of the plunger to move the plunger to the second position so that the brake pad is free of the floor.

In another aspect, an article of furniture includes a frame supporting the article of furniture relative to a floor and having a traversal interface configured to allow lateral movement of the article of furniture relative to the floor, and a floor brake assembly. The floor brake assembly further includes a base adapted to be affixed to the frame and having a pivot point at a base first end, a bore at a base second end, a plunger extending through the bore and having a brake pad at a plunger first end and head at a plunger second end, wherein the plunger is moveable within the bore between a first position where the brake pad engages a floor and a second position where the brake pad is free of the floor, and wherein the plunger is biased away from the first position, a pivot arm rotatably mounted to the base intermediate the base first end and the base second end, and having a free end with a boss extending normally therefrom, wherein the pivot arm is rotatable between a braking position and an unbraking position, a first activation arm pivotally mounted to the base at the pivot point, and having an activation point engaging the head of the plunger and a cam surface between the mounting to the pivot point and activation point wherein the boss engages the cam surface, and a second activation arm pivotally mounted to the base at the pivot point, adjacent to the first activation arm, and having a free end biased away from the base, and having a continuous channel, wherein the boss engages the continuous channel, and the continuous channel includes a catch. When the pivot arm is rotated to the braking position, the boss traverses the continuous channel to stop at the catch while simultaneously engaging the cam surface to urge the activation point of the first activation arm against the head to force the plunger to the first position so that the brake pad engages the floor, preventing lateral movement of the article of furniture relative to the floor, and when the pivot arm is rotated to the unbraking position, the boss traverses the continuous channel out of the catch while simultaneously engaging the cam surface to enable the activation point of the first activation arm to move away from the base, allowing the bias of the plunger to move the plunger to the second position so that the brake pad is free of the floor, allowing lateral movement of the article of furniture relative to the floor.

DESCRIPTION OF EMBODIMENTS OF THE INVENTION

The invention may be implemented in any environment wherein a unit, such as a box, container, bin, or article of furniture is configured to move relative to a supporting floor, wherein the floor is configured to provide a suitable support from which to base a braking system configured to prevent movement of the unit relative to the floor. For purposes of this description, such movable unit will be generally referred to as an article of furniture or similar language; however embodiments of the disclosure can be equally suitable for any movable unit in a residential, industrial, or medical setting.

Figure 1:
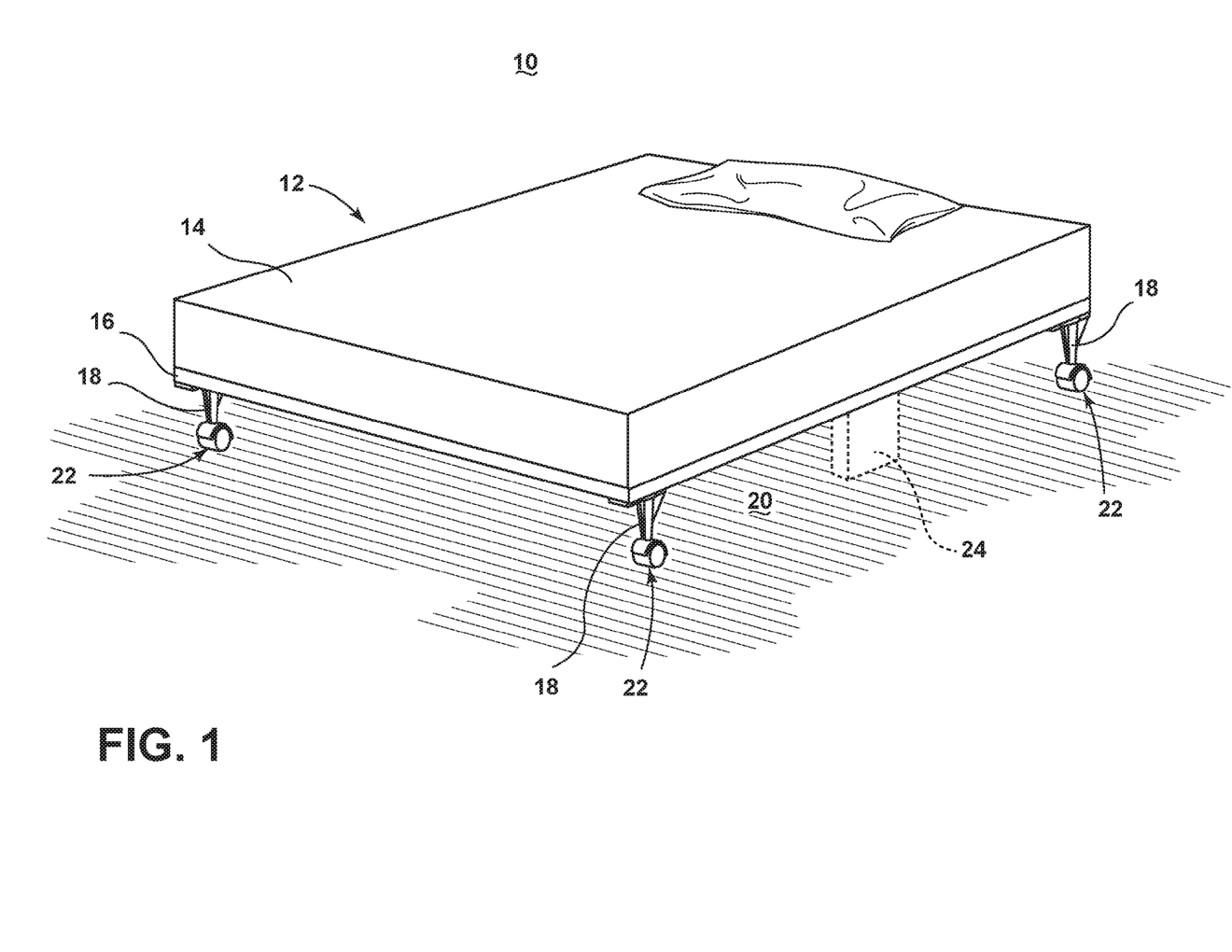
FIG. 1 is a perspective schematic view of an article of movable furniture.

FIG. 1 illustrates an article of furniture 10, shown as a bed 12, having a mattress 14, a structural frame 16, configured to support the mattress 14, and a set of legs 18 structurally supporting the frame 16 against a floor 20. Each of the set of legs 18 can further include a traversal interface 22, shown as a corresponding set of wheels, configured to allow traversal movement of the furniture 10, bed 12, mattress 14, frame 16, or set of legs 18 relative to the floor. The traversal interface 22 can, for example, provide for a single direction of traversal movement relative to the floor (e.g. forward and backward), or multidirectional traversal movement relative to the floor (e.g. forward, backward, side-to-side).

While the traversal interface 22 has been illustrated as wheeled legs interacting with the floor 20, embodiments of the disclosure envision any form of traversal interface allowing partial or full movement of the article of furniture 10 relative to the floor 20. Alternative traversal interfaces 22 can include, but are not limited to, bearings, slide rails, tracks, and the like. Moreover, embodiments of the disclosure are envisioned wherein the article of furniture 10 or the traversal interface 22 can be further coupled with one or more mechanical, hydraulic, or electro-mechanical movement mechanisms such as pistons, or other propulsion devices to provide for the movement of the article of furniture 10 relative to the floor 20.

As shown, the article of furniture 10 can further include a brake assembly 24 supported by at least one of the article of furniture 10, bed 12, mattress 14, frame 16, or legs 18 configured to selectably prevent movement of the furniture 10 relative to the floor 20. While only a single brake assembly 24 has been illustrated, embodiments of the disclosure are envisioned including a plurality of brake assemblies 24, selectably controlled as a group or individually, to prevent movement of the article of furniture 10 relative to the floor 20. Additionally, the illustrated position of the brake assembly 24 relative to the article of furniture 10, bed 12, mattress 14, frame 16, set of legs 18, or floor 20 is understood as merely one non-limiting example embodiment of the disclosure, and alternative position of the assembly or assemblies 24 relative to any of the aforementioned components 10, 12, 14, 16, 18, 20 is envisioned.

For instance, embodiments of the disclosure are envisioned wherein opposing brake assemblies are simultaneously controlled on each side of the frame 16 by a single user-controllable interface, such as a handle, lever, foot pad, step pad, electro-mechanical mechanism, or the like. In another example embodiment, a set of brake assemblies 24 can be selectably added or removed to the article of furniture 10, for instance, via a quick-latching mechanism, to provide additional or individually-controllable braking capabilities (as-needed or on-demand) for the furniture 10, for various environmental or flooring 20 conditions. For example, an article of furniture 10 on an incline may need additional brake assemblies 24 to prevent movement of the furniture 10 relative to the floor 20, or an article of furniture 10 may need a different brake assembly 24 to prevent movement of the furniture 10 while on a smooth surface, compared with a brake assembly 24 configured for braking on carpet.

As explained above, while the article of furniture 10 has been illustrated in the form of a bed 12, the brake assembly 24 can be configured to operate with any unit, box, container, bin, or article of furniture 10, such as chairs, tables, beds, and the like. The configuration of the brake assembly 24 will be described in further detail below.

Figure 2:
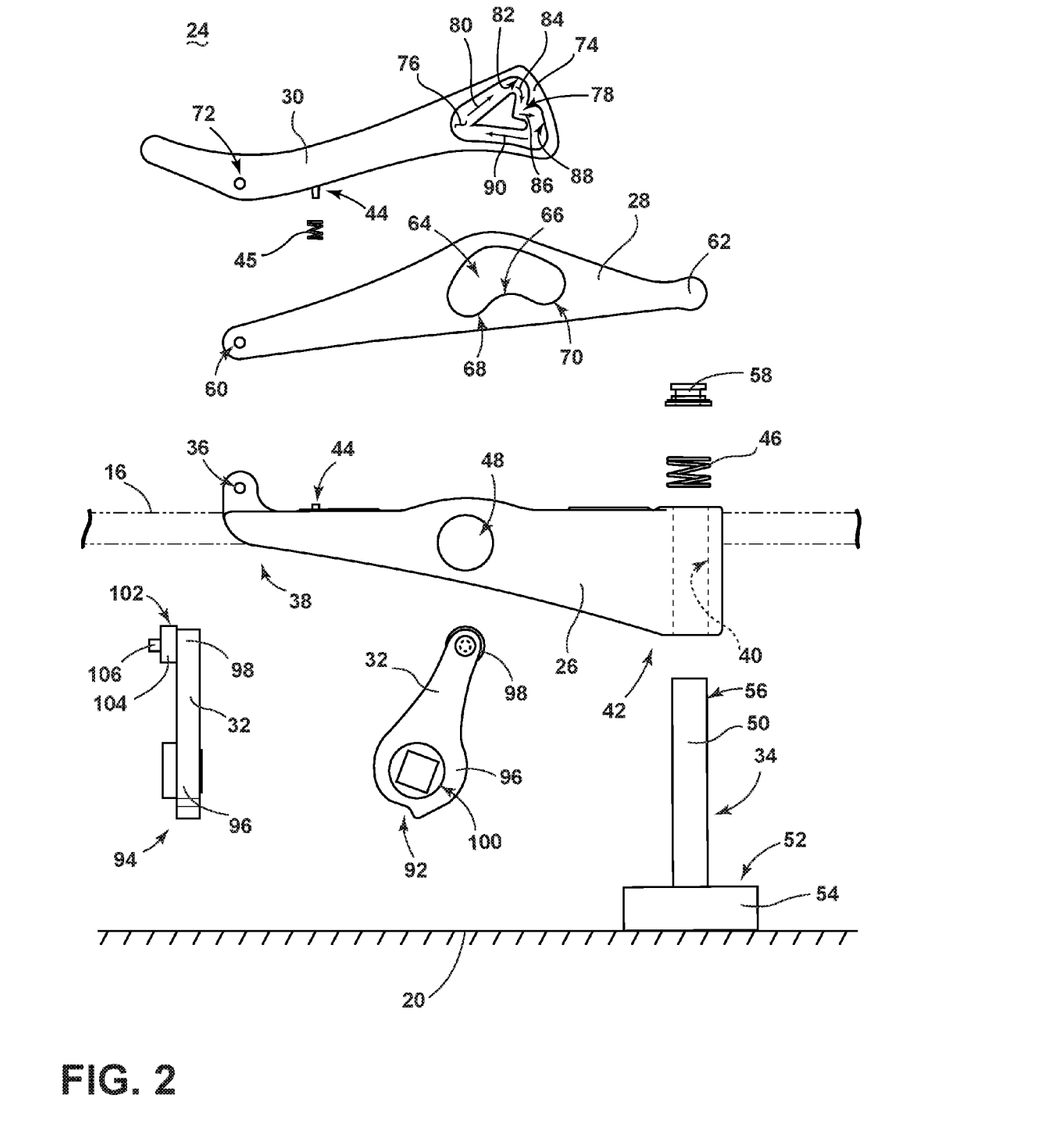
FIG. 2 is an exploded view of a floor brake assembly for the article of furniture of FIG. 1.

FIG. 2 illustrates an exploded side view of the brake assembly 24. As shown, the brake assembly 24 can include a base component 26, a first activation arm 28, a second activation arm 30, a pivot arm 32, and a plunger 34. The base 26 can be removably coupled with, supported by, or adapted to be affixed to the frame 16 (shown in dotted outline) or the article of furniture 10, and can be configured to include a pivot point 36 or pivot mounting bracket at a first end 38 of the base 26, and a bore 40 (shown in dotted outline) at a second end 42 of the base 26. As shown, the bore 40 can be configured to define an aperture though the base 26, in a direction normal to the floor 20 (shown for reference). The base 26 can further include a biasing mount 44 configured to receive a biasing element 45, such as a mechanical spring, and a pivot arm mount 48 configured to receive or mount the pivot arm 32 with the base 26.

While the bore 40 is illustrated normal to the floor 20, alternative configurations are envisioned wherein the bore 40 extends though the base 26 at an angle not normal to the floor 20, for example, at a 45 degree angle relative to the floor 20, where the brake assembly 24 is intended to be used on an incline. Moreover, alternative configurations of the base 26 can include a configurable or selectable second end 42 or bore 40 to allow a user to change, select, or modify the angle of the bore 40 direction relative to the floor 20.

The plunger 34 can include a shaft 50 with a first end 52 having a stopping element 54 and a second end 56 having a head 58 (illustrated separate from the shaft 50 for ease of understanding the brake assembly 24). The stopping element 54 is configured to interact with the floor 20 to prevent, hinder, inhibit, or restrain movement of the article of furniture 10 relative to the floor 20. For example, the stopping element 54 can include a brake pad, a friction pad, or suction cup, that when held against the floor 20, is configured to fully or partially restrain lateral movement, relative to the floor 20, of any components coupled with the plunger 34.

The shaft 50 of the plunger 34 is keyed or sized to be received by the bore 40 of the base 26 such that the assembling of the plunger 34 with the base 26 can operatively prevent movement of the base 26 (and, for example, the frame 16) relative to the floor 20, by way of the stopping element 54 restraining movement of the plunger 34 relative to the floor 20. The first end 52 of the plunger 34 can be configured to axially extend through and beyond the bore 40, where it may be coupled with the head 58. In this sense, the head 58 can be configured to prevent the plunger 34 or shaft 50 from being removed from the bore 40 without disassembly. In one non-limiting example configuration, the head 58 may be configured with a diameter greater than the diameter of the bore 40, and other assembly configurations are envisioned.

The plunger can also include a biasing element 46, such as a mechanical spring, configured to bias the plunger 34 away from the floor 20. For example, in the configuration shown, a biasing element 46 can be configured about the second end 56 of the shaft 50 that extends axially beyond the bore 40 when the plunger 34 and base 26 are assembled. In this example, the biasing element 46, bore 40, shaft 50, and head 58 can be configured such that the biasing element 46 is physically restrained in the direction of the bias by the head 58 and an opening of the bore 40 (i.e. the biasing element 46 cannot be received within the bore 40). In one non-limiting configuration, the biasing element 46 can be a spring having a diameter large enough to receive the shaft 50 through the spring, but also configured such that the diameter of the head 58 is greater than the diameter of the biasing element 46, and that the diameter of the bore 40 is less than the diameter of the biasing element 46.

The plunger 34 or shaft 50 can be configured to be moveable within or slidably coupled with the bore 40. In this configuration, the plunger 34 can move within the bore 40 between a first position, wherein the plunger 34 extends towards the floor 20 from the base 26 such that the stopping element 54 engages the floor 20, and a second position, wherein the plunger 34 moves away from the floor 20 such that the stopping element 54 does not engage, or is free from, the floor 20. Thus, an assembled base 26, plunger 34 and biasing element 46 can be configured such that the biasing element 46 biases, or naturally "rests" the plunger 34 in the second position wherein the stopping element 54 would not be in contact with the floor 20. Conversely, the bias of the biasing element 46 can be overcome, and wherein a force applied to the head 58 of the plunger 34, if greater than the biasing force of the biasing element 46, can extend the plunger 34 through the bore 40 downward into the second position, such that the stopping element 54 engages the floor 20.

The first activation arm 28 includes a first pivot coupling point 60 configured to mount with the pivot point 36 of the base 26, and an activation point 62 distal from the pivot coupling point 60, and configured to contact the head 58 of the plunger 34. The first activation arm 28 can further include an aperture 64 extending though the arm 28, positioned between the pivot coupling point 60 and the activation point 62, and defining a surface 66 configured to receive a mechanical or physical interaction with one or more components, described below. As shown, the aperture 64 can be configured to include a first leg 68 and a second leg 70, wherein the first and second leg 68, 70 are non-linear. In one non-limiting example, the surface 66 can include a cam surface configured to receive a cam. In another non-limiting example, the surface 66 can include a groove or channel configured to receive a ball bearing. Additional configurations of the aperture 64 or surface 66 are envisioned.

The first activation arm 28 is configured such that when the first pivot coupling point 60 mounts with the pivot point 36 of the base 26, the activation point 62 is configured to engage the head 58 of the plunger 34. In this sense, the first activation arm 28 can be pivotally mounted with the base 26 at the pivot point 36 such that rotation of the arm 28 and activation point 62 about the pivot point 36 allows the movement of the activation point 62 to engage the head 58, and consequently, to move the plunger 34 between the first position and the second position.

The second activation arm 30 includes a second pivot coupling point 72 configured to mount with the pivot point 36 of the base 26, a biasing mount 44 located to correspond to the biasing mount 44 of the base 26, and having a free end 74, distal from the second pivot coupling point 72. As used herein, the free end 74 is "free" in the sense that it can rotate freely about the second pivot coupling point 72. The free end 74 can further include a continuous or closed loop channel 76, track, or pathway, wherein at least a portion of the channel 76 defines a catch 78 or trap.

The catch 78 can be a portion of the channel 76 wherein a component traversing the channel 76 would be prevented from completing a full loop in the channel 76 when moving in a linear direction. For example, the channel 76 illustrated is configured to prevent a component traversing the channel 76 in the linear direction represented by a first arrow 80 when the component abuts or confronts a first retaining wall 82. The component traversing the channel 76 can change direction of traversal, illustrated as a second arrow 84, causing the component to "fall" into the catch 78, where, for example, the component can rest without having to move in any direction of traversal, absent a new compulsion of the component in the same or parallel linear direction as the first arrow 80.

If the component again traverses the channel 76 in a parallel direction, represented by a third arrow 86, the component can travel along another portion of the channel 76 configured such that the component can abut or confront a second retaining wall 88, but a following change in the direction of traversal, illustrated by a fourth arrow 90, causes the component to "fall" out of the trap, and traverse along the remaining portion of the channel 76 back to the starting position. As illustrated, and explained herein, the channel 76 and catch 78 can be configured such that a component traversing the channel 76 may need two discrete linear traversals, with a break, or corresponding change in direction of traversal between the discrete traversals, in order to traverse the complete loop of the channel 76. While a linear direction is provided as an example of how a component can traverse the channel 76, embodiments of the disclosure are not limited to strictly linear directions, and at least one of the channel 76 or catch 78 can be configured such that slightly non-linear directions, for example, rotational direction such as from a lever or arm distal from a pivot point, can provide the aforementioned loop-traversing capability.

The second activation arm 30 is configured such that when the second pivot coupling point 72 mounts with the pivot point 36 of the base 26, the corresponding biasing mounts 44 on the second activation arm 30 and the base 26 can mount, restrain, or hold a biasing element configured to bias the second activation arm 30 away from the base 26, about the pivot point 36. In this sense, the second activation arm 30 is pivotally mounted with the base 26 at the pivot point 36, just as with the first activation arm 28. However, embodiments of the disclosure are envisioned wherein the first and second activation arms 28, 30 are configured to be adjacent to each other 28, 30 and independently pivotally mounted with the pivot point 36. Stated another way, each of the arms 28, 30 can pivot independent of the other arm 30, 28, about the pivot point 36. As shown, the biasing element 45 can include a mechanical spring, however alternative or additional biasing elements 45 can be included.

The pivot arm 32 is illustrated in both a front-facing view 92, as the pivot arm 32 would be assembled with the other brake assembly 24 components 26, 28, 30, 34, and in a side-facing view 94, to better show some of the features of the arm 32. As shown on the front-facing view 92, the pivot arm 32 includes a first end 96 and a distal free end 98. As used above, the free end 98 is "free" in the sense that it can rotate freely about the first end 96. The first end 96 can include a pivot mounting 100 configured to mount the pivot arm 32 with the pivot arm mount 48 of the base 26. The pivot mounting 100 or first end 96 can further include a biasing element (not shown) configured so that assembling of the pivot arm 32 with the base 26 biases the pivot arm in a counter-clockwise direction about the first end 96, relative to the base 26. While a counter-clockwise direction bias is described, it is understood that a clockwise bias may be equally interchangeable with embodiments of the disclosure, as well as alternative configurations of the channel 76 of the second activation arm 30 to enable the operation of the brake assembly 24, described below. The first end 96 can further be configured or keyed to receive a source of rotational force for rotating the pivot arm 32 about the pivotal mounting with the base 26 to generate rotation of the free end 98 in the same or opposing direction of the bias, if a biasing element is utilized. For example, the source of rotational force for rotating the pivot arm 32 can include a mechanical interface, which can be further keyed to rotate the pivot arm 32 in a predetermined direction.

As shown in the side-facing view 94, the first end 96 can further include a boss 102 extending normally from the first end 96. In the example illustrated, the boss 102 can include a set of bosses, such as a first boss 104 extending normally from the free end 98 and a second boss 106 extending normally farther than, or past, the first boss 104 and having a diameter less than the diameter of the first boss 104. As shown, the first and second bosses 104, 106 can be axially aligned. Embodiments of the disclosure are envisioned wherein each boss 104, 106 is configured as a cam, and configured to match corresponding components. For example, the first boss 104 can include a rolling cam configured to match the aperture 64, surface 66, or legs 68, 70 of the first activation arm 28. Likewise, the second boss 106 can include a cam or ball bearing configured to match the channel 76 of the second activation arm 30. Each boss 104, 106 can, for example, have a different configuration including structure, diameter, length of extension normally away from the free end 98, etc.

Figure 3:
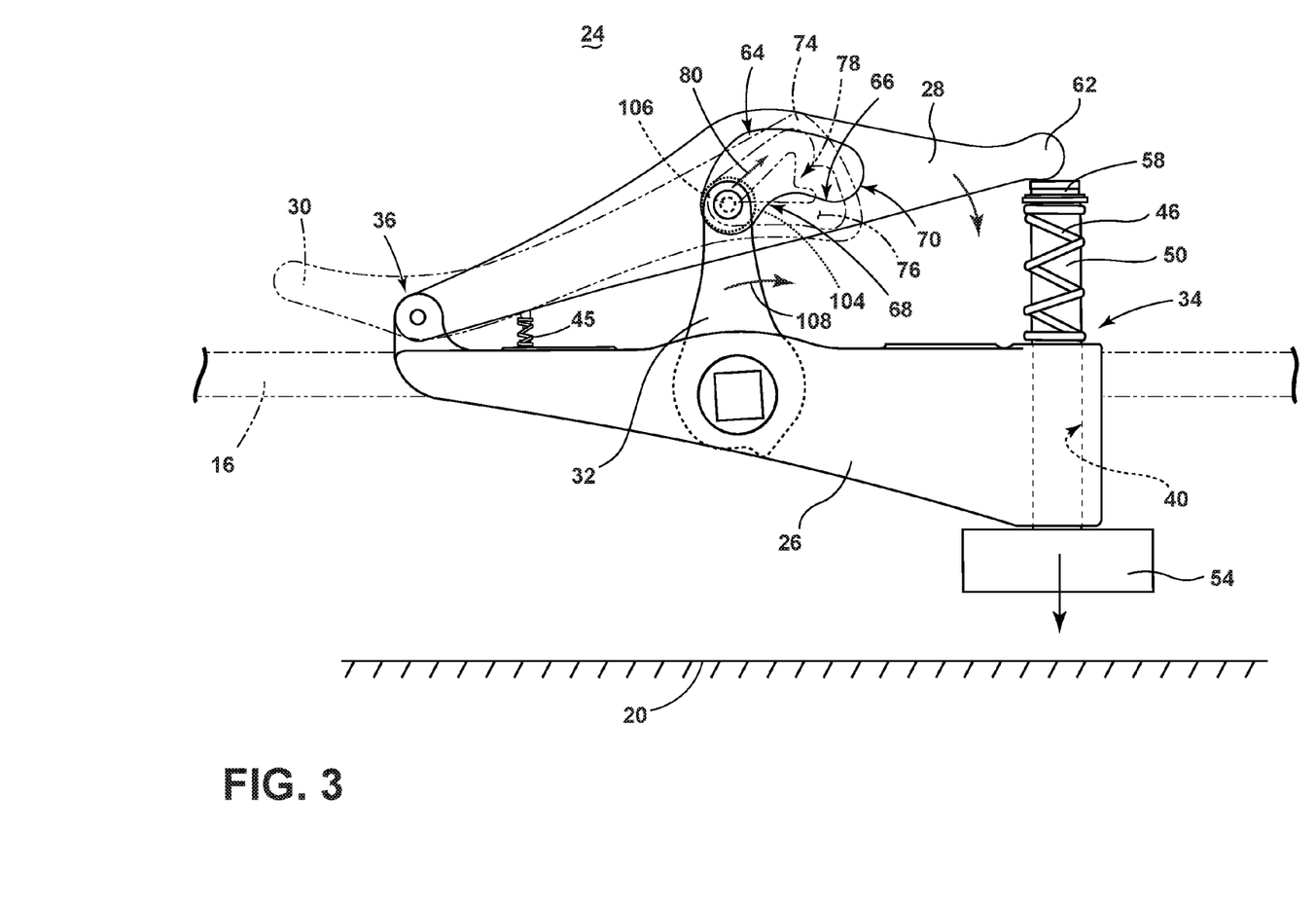
FIG. 3 is an assembled view of the floor brake assembly of FIG. 2, showing movement of a pivot arm to engage the floor brake with the floor.

FIG. 3 illustrates an example embodiment of the assembled brake assembly 24. For ease of understanding, the brake assembly 24 is illustrated in an "unbraking position," that is, where the plunger 34 is in the second position and the brake pad 54 is free of, or is not engaging the floor 20. In the illustrated example, the pivot arm 32 is rotatably mounted to the base 26 intermediate the first end 38 and second end 42 of the base 26. Additionally, the first boss 104 of the pivot arm 32 engages the surface 66 of the first activation arm 28, and simultaneously, the second boss 106 of the pivot arm 32 engages the channel 76 of the second activation arm 30. As explained above, the pivot arm 32 can be configured to be biased in a counter-clockwise direction, relative to the base 26, such that the first boss 104 of the pivot arm 32 is biased against at least a portion of the first leg 68 of the surface or the second boss 106 is biased a wall of the channel 76. The pivot arm 32 can further be biased in the opposite direction of the predetermined direction of rotation, delivered by the source of pivot arm 32 rotation, as explained above.

When a source of rotation rotates the pivot arm 32 in a clockwise direction (illustrated as arrow 108), the second boss 106 traverses a portion of the channel (shown by arrow 80). During this traversal 80, the fixed radial length of the pivot arm 32, in addition to the interaction of the second boss 106 with the channel 76, can rotate the second activation arm 30 about the pivot point 36 of the base 26 to force the second activation arm 30 closer to the base 26, overcome the biasing element 45 attempting to bias the arm 30 away from the base 26. While the traversal 80 is occurring, the first boss 104, moving in unison with the second boss 106, is likewise traversing the surface 66 of the aperture 64 in the first activation arm 28, and may traverse from the first leg 68 of the surface 66 to the second leg 70. During the traversal 80, and similar to the movement of the second activation arm 30, the fixed radial length of the pivot arm 32, in addition to the interaction of the first boss 104 with the surface 66 of the first activation arm 28, rotates the first activation arm 28 about the pivot point 36 of the base 26 to force the first activation arm 28 closer to the base 26. The rotation of the first activation arm 28, and consequently the activation point 62, closer to the base 26 in turn urges the activation point 62 against the head 58 of the plunger 34, forcing the plunger 34 downward to the first position, wherein the brake pad 54 engages the floor 20. Collectively, the rotation of the pivot arm 32 and the movements of the first activation arm 28, the second activation arm 30, and the plunger 34 transition the brake assembly 24 from the unbraking position to the braking position, wherein the frame 16 or article of furniture 10 is restrained from movement relative to the floor 20.

Figure 4:
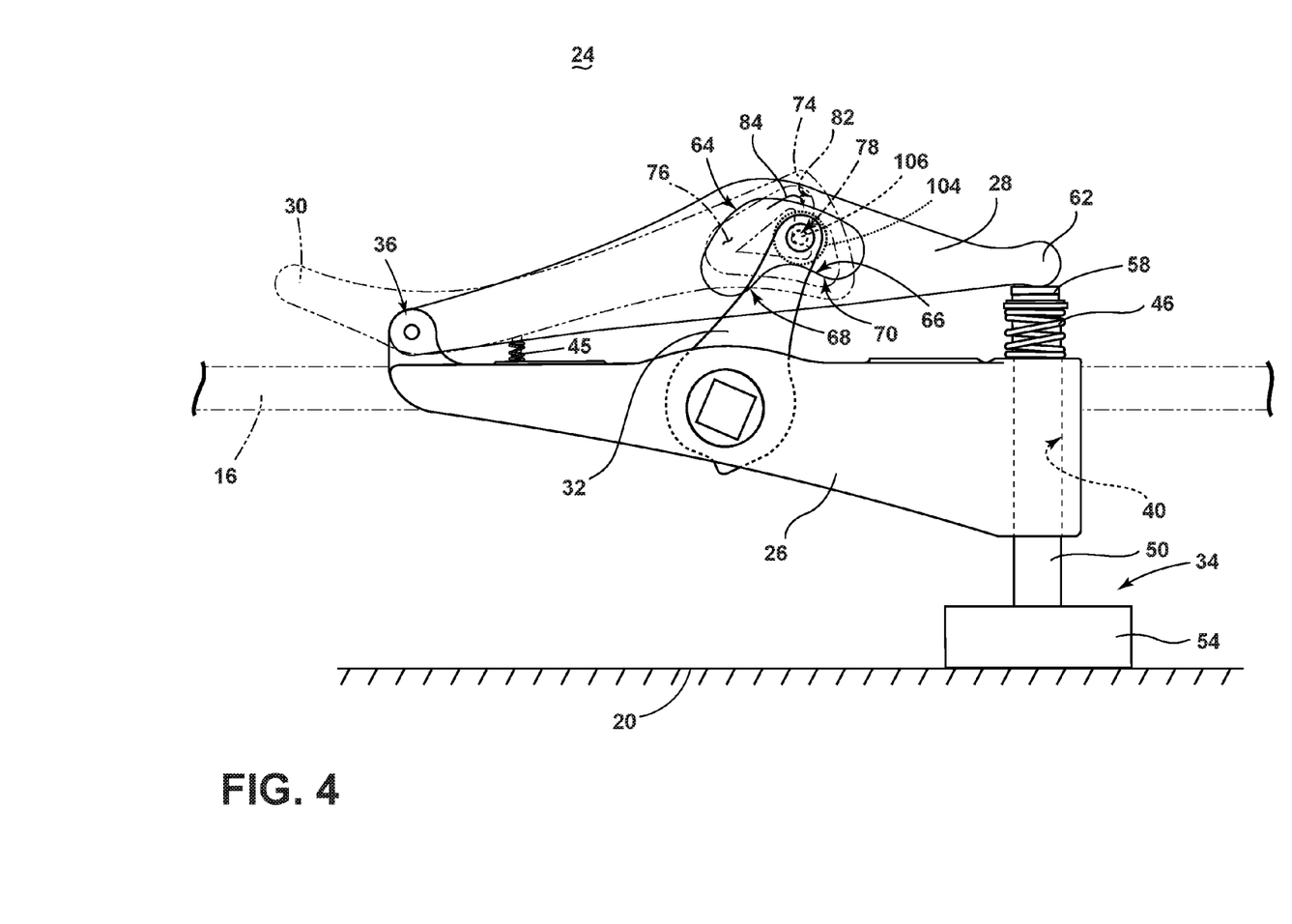
FIG. 4 is an assembled view of the floor brake assembly of FIG. 2 showing the assembly engaged with the floor.

FIG. 4 illustrates the continuation of the pivot arm 32 rotation shown in FIG. 3. As the pivot arm 32 continues to rotate, the traversal of the second boss 106 along the direction of arrow 84 within the channel 76 ultimately encounters or confronts the first retaining wall 82, preventing the second boss 106 from continuing in the same direction, and consequently, the pivot arm 32 from further clockwise rotation. Simultaneously with the second boss 106 encountering or confronting the first retaining wall 82, the biasing element 45 coupled with the second activation arm 30 biases the second activation arm 30 away from the base 26. The portion of the channel 76 relative to the catch 78 and first retaining wall 82 is configured such that the combination of the biasing and confronting of the second boss 106 with the first retaining wall 82 allows the second boss 106 to be fall into, engage with, or otherwise be positioned within the catch 78. Additionally, simultaneously with and prior to the pivot arm 32 being prevented from further clockwise rotation, the first boss 104 transitions from being biased against at least a portion of the first leg 68 to be biased against at least a portion of the second leg 70, as the first boss 104 engages the surface 66.

After the second boss 106 has encountered the first retaining wall 82, the only available movement of the pivot arm 32 is to move in a counter-clockwise direction, which for example, can be from a force rotating the pivot arm 32 about the pivot mounting 100 in a counter-clockwise direction, or by releasing the clockwise-directed force on the pivot arm 32, and allowing the pivot arm 32 to be biased in the counter-clockwise direction, as explained above.

The counter-clockwise direction of the pivot arm 32 movement, in turn, allows the second boss 106 to encounter, engage, or otherwise be nestled into the catch 78 (as illustrated), as the biasing element 45 coupled with the second activation arm 30 biases the second activation arm 30 away from the base 26. Thus, as shown, the second boss 106 has been stopped at the catch 78 of the second activation arm 30 while the first boss 104 has simultaneously engaged the second leg 70 of the surface, urging the activation point 62 of the first activation arm 28 against the head 58 of the plunger 34 to force the plunger 34 to the first position wherein the brake pad 54 engages the floor 20. Since the second boss 106 is in the catch 78, and will not be removed from the catch without further active (i.e. not biased) movement of the pivot arm 32, the second boss 106, pivot arm 32, or brake assembly 24 can be thought of as "locked" in the braking position, which can be "unlocked" to an unbraking position (e.g. where the brake assembly 24 does not engage the floor 20) with further movement by the pivot arm 32.

Figure 5:
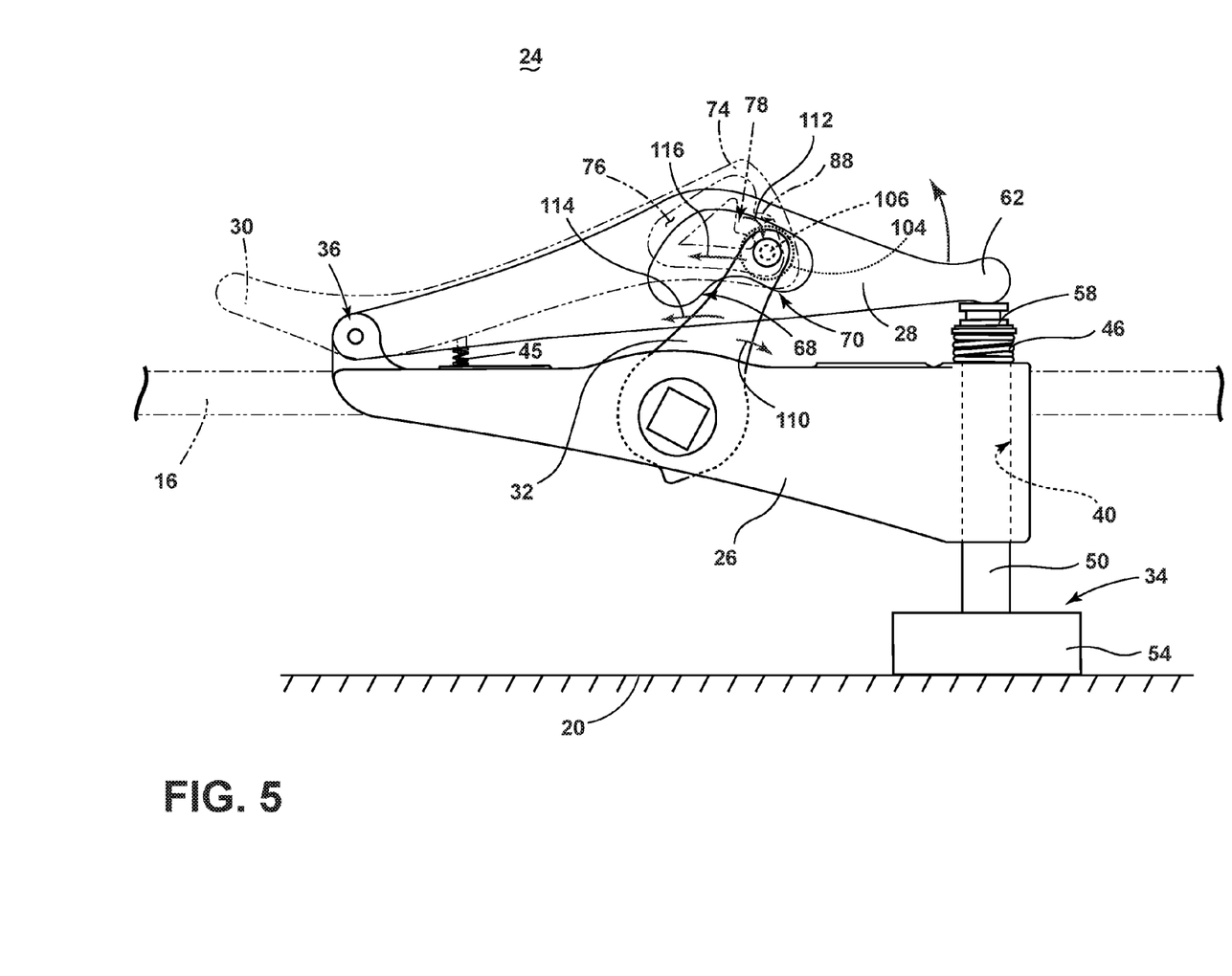
FIG. 5 an assembled view of the floor brake assembly of FIG. 2, showing movement of a pivot arm to disengage the floor brake with the floor

FIG. 5 illustrates continuation of the pivot arm 32 rotation following the arm 32 or second boss 106 resting in the catch 78 (i.e. the braking position) of FIG. 4. When a source of rotation rotates the pivot arm 32 in a clockwise direction for a second time (illustrated as arrow 110), the second boss 106 traverses a portion of the channel 76 (shown by arrow 112) until the second boss 106 encounters or confronts the second retaining wall 88, preventing further traversal of the second boss 106 caused by the clockwise motion of the pivot arm 32. Simultaneously with the second boss 106 encountering or confronting the second retaining wall 88, the biasing element 45 coupled with the second activation arm 30 biases the second activation arm 30 away from the base 26. The portion of the channel 76 relative to the catch 78 and second retaining wall 88 is configured such that the combination of the biasing and confronting of the second boss 106 with the second retaining wall 88 allows the second boss 106 to fall out of, disengage with, or otherwise be removed from the catch 78. For example, the movement of the second boss 106, illustrated by arrow 112 removes the second boss 106 from the catch 78, such that the second boss 106 is free to further traverse a portion of the channel 76.

With the pivot arm 32 prevented from being rotated in a clockwise direction due to the second boss 106 engaging or confronting the second retaining wall 88, the only available movement of the pivot arm 32 is to move in a counter-clockwise direction, which for example, can be from a force rotating the pivot arm 32 about the pivot mounting 100 in a counter-clockwise direction, or by releasing the clockwise-directed force on the pivot arm 32, and allowing the pivot arm 32 to be biased in the counter-clockwise direction, as explained above. The counter-clockwise motion of the pivot arm 32 is illustrated by arrow 114.

As the pivot arm 32 moves in the counter-clockwise motion 114, the second boss 106 traverses along a portion of the channel 76 represented by arrow 116, and returns to the unbraking position shown in FIG. 3. Simultaneously with the second boss 106 falling out of the catch 78 and traversing the channel 76 in the direction of arrow 116, the first boss 104 engages the surface 66 to traverse from the second leg 70 to the first leg 68, as guided by the counter-clockwise movement 114 of the pivot arm 32. The traversal of the first boss 104 to the first leg 68 releases the downward pressure from the activation point 62 of the first activation arm 28, allowing the activation arm 28 to move away from the base 26. The bias of the plunger 34 biasing element 46 biases the plunger 34, which is no longer held in the first position by the activation point 62 or first activation arm 28, toward the second position, wherein the brake pad 54 is free of the floor 20. The bias of the plunger 34 biasing element 46 further biases the activation point 62 or first activation arm 28 away from the base 26, by way of the activation point 62 engaging the head 58 of the plunger 34.

Thus, embodiments of the disclosure describe a brake assembly 24 for an article of furniture 10 wherein a pivot arm 32, in an unbraking position can be rotated or moved in a first direction to engage a catch 78 which locks or holds the brake assembly 24 in a braking position, and wherein the pivot arm 32 can be rotated or moved in either a same or different direction to disengage the catch 78, which unlocks or removes the brake assembly 24 from the braking position to an unbraking position.

Many other possible embodiments and configurations in addition to that shown in the above figures are contemplated by the present disclosure. For example, as explained above, embodiments of the disclosure contemplate different sources of rotational, transitional, or lateral movement of the pivot arm 32 as used herein. Non-limiting examples of sources of pivot arm 32 movement can include a lever, step pad, remote controlled mechanical mechanisms, or the like. Additionally, embodiments of the disclosure envision including one or more biasing elements 45, 46 or dampeners to reduce vibrations or audible noise during operation of the brake assembly 24.

Another possible embodiment contemplated by the present disclosure can include a set of brake assemblies 24 removably affixed with the frame 16, wherein the set, or a subset, of the brake assemblies 24, pivot arms 32, first or second activation arms 28, 30, or brake pads 54 are simultaneously controllable by a common mechanical interface, such as a single lever. Yet another possible embodiment of the present disclosure can be configured such that first and second activation arms 28, 30 are positioned on opposing sides of the pivot arm, and wherein the pivot arm 32 includes a first boss 104 extending normally from the pivot arm 32 on the first side, and a second boss 106 extending normally from the pivot arm 32 on the opposing second side. Additionally, the design and placement of the various components may be rearranged such that a number of different in-line configurations could be realized.

The embodiments disclosed herein provide a floor brake assembly for an article of furniture. One advantage that may be realized in the above embodiments is that the above-described embodiments have enabled easy operation of locking/unlocking or braking/unbraking a brake assembly, allowing a user to operate the brake assembly without direct inspection of whether the brake assembly engages the floor or not. Additionally, the brake assembly utilizes a pivot arm that can be configured to alternate between the braking and unbraking position by utilizing the same clockwise or counter-clockwise motion or direction by a user, such as via a lever, or a step pad. Thus, different motions are not needed to alternate between the braking and unbraking positions.

Another advantage that may be realized in the above embodiments is that the above-described embodiments allow for locking the braking position in place by way of the catch 78 configuration of the channel 76. In this configuration, once the brake assembly is in the braking position, the catch 78 allows the brake assembly to remain in the braking position until a user engages the pivot arm to unlock the brake assembly from the braking position. The utilization of the catch reduces the need to provide constant force, pressure, or monitoring of the brake assembly while in the braking position, and can reduce the accidental unlocking of the brake assembly from the braking position to the unbraking position. Yet another advantage can include the modular inclusion of one or more brake assemblies on a single article of furniture to provide increased or improved braking capabilities on different floor terrains, such as on inclines, or with brake pads 54 configured for braking on specific surface types, as described above. Moreover, the first activation arm 28, second activation arm 30, surface 66, first leg 68, second leg 70, channel 76 and/or catch 78 can be configured, designed, or engineered to minimize activation force, such as the source of rotation for the pivot arm, for instance, by a user, while maximizing brake pad application pressure to the floor surface. Such configurations are especially beneficial in user settings wherein the user may be physically limited, such as in a medical or retirement facility.

To the extent not already described, the different features and structures of the various embodiments may be used in combination with each other as desired. That one feature may not be illustrated in all of the embodiments is not meant to be construed that it may not be included, but is done for brevity of description. Thus, the various features of the different embodiments may be mixed and matched as desired to form new embodiments, whether or not the new embodiments are expressly described. Moreover, while "a set of" various elements have been described, it will be understood that "a set" may include any number of the respective elements, including only one element. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A floor brake assembly, comprising:
    a base adapted to be affixed to an article of furniture and having a pivot point at a base first end, and a bore at a base second end;
    a plunger extending through the bore and having a brake pad at a plunger first end and head at a plunger second end, wherein the plunger is moveable within the bore between a first position where the brake pad engages a floor and a second position where the brake pad is free of the floor, and wherein the plunger is biased away from the first position;
    a pivot arm rotatably mounted to the base intermediate the base first end and the base second end, and having a free end with a boss extending normally therefrom, wherein the pivot arm is rotatable between a braking position and an unbraking position;
    a first activation arm pivotally mounted to the base at the pivot point, and having an activation point engaging the head of the plunger and a cam surface between the mounting to the pivot point and activation point wherein the boss engages the cam surface; and
    a second activation arm pivotally mounted to the base at the pivot point, adjacent to the first activation arm, having a free end biased away from the base, and having a continuous channel, wherein the boss engages the continuous channel, and the continuous channel includes a catch;
    wherein when the pivot arm is rotated to the braking position, the boss traverses the continuous channel to stop at the catch while simultaneously engaging the cam surface to urge the activation point of the first activation arm against the head to force the plunger to the first position so that the brake pad engages the floor, and when the pivot arm is rotated to the unbraking position, the boss traverses the continuous channel out of the catch while simultaneously engaging the cam surface to enable the activation point of the first activation arm to move away from the base, allowing the bias of the plunger to move the plunger to the second position so that the brake pad is free of the floor.

2. The floor brake assembly of claim 1 wherein the brake pad is configurable to adapt to different floor types to prevent lateral movement of the floor brake assembly relative to the floor.

3. The floor brake assembly of claim 1 wherein the pivot arm is rotated by a mechanical interface.

4. The floor brake assembly of claim 3 wherein the mechanical interface is keyed to rotate the pivot arm in a predetermined direction.

5. The floor brake assembly of claim 4 wherein the pivot arm is biased opposed to the predetermined direction.

6. The floor brake assembly of claim 3 wherein the mechanical interface comprises at least one of a handle, a lever, a foot pad, a step pad, or an electro-mechanical mechanism.

7. The floor brake assembly of claim 3 wherein at least one of a set of pivot arms or a set of brake pads are simultaneously controllable by a common mechanical interface.

8. The floor brake assembly of claim 1, further comprising a dampener configured to reduce at least one of audible noise or vibration generated during operation of the floor brake assembly.

9. The floor brake assembly of claim 1 wherein the rotation of the pivot arm to the braking position and the rotation of the pivot arm to the unbraking position are in identical directions.

10. The floor brake assembly of claim 1 wherein the first and second activation arms are positioned adjacent to a first side of the pivot arm having the boss.

11. The floor brake assembly of claim 10 wherein the pivot arm includes a first boss extending normally from the pivot arm on the first side, and a second boss extending normally from the pivot arm on the first side, wherein the first and second bosses are axially aligned, and wherein the second boss extends past the first boss.

12. The floor brake assembly of claim 11 wherein the first boss is configured to engage the cam surface of the first activation arm and the second boss is configured to engage the channel of the second activation arm.

13. The floor brake assembly of claim 1 wherein the first and second activation arms are positioned on opposing sides of the pivot arm.

14. The floor brake assembly of claim 13 wherein the pivot arm includes a first boss extending normally from the pivot arm on a first side, and a second boss extending normally from the pivot arm on an opposing second side.

15. The floor brake assembly of claim 14 wherein the first boss is configured to engage the cam surface of the first activation arm and the second boss is configured to engage the channel of the second activation arm.

16. The floor brake assembly of claim 1 wherein the first and second activation arms are independently pivotable about the pivot point.

17. An article of furniture comprising:
    a frame supporting the article of furniture relative to a floor and having a traversal interface configured to allow movement of the article of furniture relative to the floor; and
    a floor brake assembly, comprising:
        a base adapted to be affixed to the frame and having a pivot point at a base first end, a bore at a base second end;
        a plunger extending through the bore and having a brake pad at a plunger first end and head at a plunger second end, wherein the plunger is moveable within the bore between a first position where the brake pad engages a floor and a second position where the brake pad is free of the floor, and wherein the plunger is biased away from the first position;
        a pivot arm rotatably mounted to the base intermediate the base first end and the base second end, and having a free end with a boss extending normally therefrom, wherein the pivot arm is rotatable between a braking position and an unbraking position;
        a first activation arm pivotally mounted to the base at the pivot point, and having an activation point engaging the head of the plunger and a cam surface between the mounting to the pivot point and activation point wherein the boss engages the cam surface; and
        a second activation arm pivotally mounted to the base at the pivot point, adjacent to the first activation arm, and having a free end biased away from the base, and having a continuous channel, wherein the boss engages the continuous channel, and the continuous channel includes a catch;
    wherein when the pivot arm is rotated to the braking position, the boss traverses the continuous channel to stop at the catch while simultaneously engaging the cam surface to urge the activation point of the first activation arm against the head to force the plunger to the first position so that the brake pad engages the floor, preventing movement of the article of furniture relative to the floor, and when the pivot arm is rotated to the unbraking position, the boss traverses the continuous channel out of the catch while simultaneously engaging the cam surface to enable the activation point of the first activation arm to move away from the base, allowing the bias of the plunger to move the plunger to the second position so that the brake pad is free of the floor, allowing movement of the article of furniture relative to the floor.

18. The article of furniture of claim 17, wherein the floor brake assembly is removably affixed to the frame.

19. The article of furniture of claim 17 wherein the frame is configured to support a set of floor brake assemblies.

20. The article of furniture of claim 19 wherein the set of floor brake assemblies are simultaneously controllable by a common mechanical interface.

\* \* \* \* \*